United States Patent
Brok et al.

(10) Patent No.: US 10,518,808 B2
(45) Date of Patent: Dec. 31, 2019

(54) METHOD FOR INFLUENCING THE DIRECTION OF TRAVEL OF MOTOR VEHICLES

(71) Applicant: AUDI AG, Ingolstadt (DE)

(72) Inventors: Tobias Brok, Kösching (DE); André Wesenberg, Pfaffenhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/073,061

(22) PCT Filed: Jan. 19, 2017

(86) PCT No.: PCT/EP2017/051079
§ 371 (c)(1),
(2) Date: Jul. 30, 2018

(87) PCT Pub. No.: WO2017/137228
PCT Pub. Date: Aug. 17, 2017

(65) Prior Publication Data
US 2019/0039651 A1 Feb. 7, 2019

(30) Foreign Application Priority Data
Feb. 11, 2016 (DE) .................. 10 2016 001 592

(51) Int. Cl.
*B62D 17/00* (2006.01)
*B62D 6/00* (2006.01)

(52) U.S. Cl.
CPC ............... *B62D 17/00* (2013.01); *B62D 6/00* (2013.01)

(58) Field of Classification Search
CPC ........... B62D 17/00; B62D 6/00; B62D 9/005

USPC ............................................. 701/41
See application file for complete search history.

(56) References Cited

U.S. PATENT DOCUMENTS

| 5,305,218 A * | 4/1994 | Ghoneim | B60L 15/2036 180/197 |
| 6,611,784 B2 * | 8/2003 | Tobaru | B60R 16/0234 701/1 |
| 7,369,927 B2 * | 5/2008 | Hille | B60W 30/04 280/5.502 |

(Continued)

FOREIGN PATENT DOCUMENTS

| CN | 101722807 A | 6/2010 |
| CN | 202320495 U | 7/2012 |

(Continued)

OTHER PUBLICATIONS

International Search Report dated Mar. 30, 2017 of corresponding International application No. PCT/EP2017/051079; 5 pgs.

(Continued)

*Primary Examiner* — Tuan C To
(74) *Attorney, Agent, or Firm* — Maier & Maier, PLLC

(57) ABSTRACT

A method for influencing the direction of travel of motor vehicles. The motor vehicle has a first steering system, having at least one steering axle with at least two wheels. The wheels are connected to the steering axle through wheel suspensions that can be adjusted by actuators. A redundant steering system is realized by adjusting a steering roll radius of at least one of the steering axles, according to which a force component acting orthogonally to the direction of travel in the region of at least one wheel is applied to the first steering system.

10 Claims, 3 Drawing Sheets

(56) References Cited

U.S. PATENT DOCUMENTS

| | | | |
|---|---|---|---|
| 7,966,146 B2 * | 6/2011 | Shkolnikov | G01C 21/165 340/573.1 |
| 9,162,656 B2 * | 10/2015 | Mattson | B60T 8/17554 |
| 2002/0001076 A1 * | 1/2002 | Jackson | G01B 5/0025 356/139.09 |
| 2002/0134149 A1 * | 9/2002 | Shiraishi | B60C 19/00 73/146 |
| 2004/0026158 A1 * | 2/2004 | Rieth | B62D 5/003 180/402 |
| 2005/0236896 A1 | 10/2005 | Offerle et al. | |
| 2006/0276944 A1 * | 12/2006 | Yasui | B60T 8/172 701/37 |
| 2007/0169969 A1 * | 7/2007 | Hummel | B62D 7/144 180/24.01 |
| 2008/0119978 A1 * | 5/2008 | Stieff | G01B 11/2755 701/31.4 |
| 2008/0177442 A1 * | 7/2008 | Tsukasaki | B62D 6/006 701/38 |
| 2008/0294355 A1 * | 11/2008 | Berthold | B62D 6/00 702/41 |
| 2009/0051135 A1 * | 2/2009 | Lohmuller | B60G 7/005 280/124.1 |
| 2012/0235373 A1 * | 9/2012 | Hintzen | B62D 7/09 280/93.506 |
| 2013/0075185 A1 * | 3/2013 | Sugai | B62D 5/001 180/402 |
| 2014/0035251 A1 | 2/2014 | Glanzer et al. | |
| 2015/0054244 A1 | 2/2015 | Seo et al. | |
| 2015/0151604 A1 * | 6/2015 | Park | F16H 1/28 280/124.106 |
| 2015/0151778 A1 * | 6/2015 | Kageyama | B60G 3/20 701/41 |
| 2015/0291210 A1 * | 10/2015 | Kageyama | B60T 8/1755 701/41 |
| 2018/0086374 A1 * | 3/2018 | Sato | B62D 1/046 |

FOREIGN PATENT DOCUMENTS

| | | | | |
|---|---|---|---|---|
| CN | 103476665 A | 12/2013 | | |
| CN | 104417616 A | 3/2015 | | |
| DE | 196 05 553 C1 | 8/1997 | | |
| DE | 103 30 894 A1 | 2/2005 | | |
| DE | 10 2006 046 497 A1 | 4/2008 | | |
| DE | 10 2007 043599 A1 | 3/2009 | | |
| DE | 10 2008 046 007 A1 | 3/2010 | | |
| DE | 10 2009 033 105 A1 | 1/2011 | | |
| DE | 10 2014 200 608 A1 | 7/2015 | | |
| EP | 0979769 A2 | 2/2000 | | |
| EP | 3 090 907 A1 | 11/2016 | | |
| JP | 2015107739 A | * | 6/2015 | |
| KR | 10-2007-0081894 A | 8/2007 | | |
| WO | WO-2010147100 A1 | * | 12/2010 | A61G 5/046 |

OTHER PUBLICATIONS

Written Opinion of the International Search Authority dated Mar. 30, 2017 of corresponding International application No. PCT/EP2017/051079; 7 pgs.

Examination Report dated Feb. 3, 2017 of corresponding German application No. 10 2016 001 592.6; 11pgs.

Notification of Transmittal of Translation of the International Preliminary Report on Patentability dated Aug. 23, 2018, including the Written Opinion of the International Searching Authority, in connection with corresponding International Application No. PCT/EP2017/051079 (7 pgs.).

Office Action dated Feb. 25, 2019 in corresponding Chinese Application No. 201780010840.8 including partial machine-generated English language translation; 9 pages.

Examination Report dated Aug. 22, 2019, in corresponding European Application No. 17 702 022.9 including partial machine-generated English language translation; 9 pages.

Office Action dated Aug. 9, 2019, in corresponding German Application No. 10 2016 001 592.6 including partial machine-generated English language translation; 13 pages.

Chinese Office Action dated Sep. 12, 2019, in connection with corresponding CN Application No. 201780010840.8 (13 pgs., including machine-generated English translation).

* cited by examiner

METHOD FOR INFLUENCING THE DIRECTION OF TRAVEL OF MOTOR VEHICLES

FIELD

The invention relates to a method for influencing the direction of travel of motor vehicles. The invention also relates to a motor vehicle with a redundant steering system and to a computer program with program code means.

BACKGROUND

Conventional steering systems for motor vehicles are sufficiently well known from practice. Nowadays, with few exceptions, practically all motor vehicles are equipped with a so-called axle pivot or Ackerman steering.

In recent times, driver assistance systems have been increasingly employed in motor vehicles in order to automate the driving task. As an example, an adaptive cruise control, a traffic congestion assistant, an autobahn or highway pilot, or a fully autonomously operating motor vehicle are mentioned. The higher the degree of automation of the driving task, the greater are the requirements placed on the reliability of the sensors, control instruments, actuators, and mechanical components involved in the tasks. The failure probabilities of all involved components must be as low as possible, for which reason often only redundant systems represent a solution. Accordingly, for steering systems, at least partially redundant steerings must be developed for highly automated driving, for example.

The effort involved in implementing the required failsafe performance for a steering system is very extensive and usually requires the doubling of processors, plugs, windings, cablings, and mechanical components. The assembly thereby becomes not only very complex, but also very expensive. In part for reasons of function and packing space, a doubling, in particular a doubling of mechanical components, is not possible at all.

The utilization of the motor vehicle brake for stabilization of a motor vehicle or for a redundant steering task is known. In this case, it is intended essentially to produce a yaw torque by braking on one side and thereby to assist the steering of the motor vehicle. In the process, individual wheels or all wheels on one side of the motor vehicle are braked.

DE 196 05 553 C1 relates to a steering system with an emergency steering system that is capable of actuating wheel brakes at different sides of the motor vehicle depending on the actuation of a steering control.

DE 10 2014 200 608 A1 relates to a method for operating a motor vehicle that has at least two wheel axles, at least one of which has steerable wheels, and at least one device for influencing a torque of the wheels individually for each wheel, wherein a steering of the wheels is assisted by a power steering depending on a desired steering angle. It is provided that the functional ability of the power steering is monitored and that, when a malfunction of the power steering is detected, a torque is influenced by the device at only one of the steerable wheels for adjustment of the desired steering angle.

It is known that the steering effect due to an influencing of the torque is greater, the more positive or the greater is the so-called steering roll radius or scrub radius of the steerable axles of the motor vehicle. A steering roll radius is understood to mean the distance from the point of intersection of an imaginary, extended line of the steering axle or steering axis through the plane of the roadway to the point of intersection of the centerline of the wheel contact surface through the plane of the roadway. If the point of intersection of the imaginary line of the steering axle with the roadway lies closer to the center of the motor vehicle than does the point of intersection of the centerline of the wheel contact surface with the roadway, then one refers to a positive steering roll radius. If, in contrast, the point of intersection of the imaginary line of the steering axle lies further away from the center of the motor vehicle than does the point of intersection of the centerline of the wheel contact surface with the roadway, then the steering roll radius is negative. A steering roll radius equal to zero is present when the two points of intersection coincide. During a braking operation with different frictional grip on the individual sides of the track, a motor vehicle with a positive steering roll radius tends to pull toward the side with better grip. A motor vehicle of this kind is highly sensitive to disruptions in the region of the steering system or of the wheels and can even break away when, for example, it travels over unevenness in the roadway. In contrast, a motor vehicle with a negative steering roll radius exhibits a self-stabilizing straight drivability. The motor vehicle can be prevented or at least impeded from braking away by a negative steering roll radius; the steering system acts in a track-stabilizing manner. Consequently, for reasons of comfort, the steering roll radius in motor vehicles is often designed to be negative to slightly positive. However, this then leads to the fact that, through braking on one side, it is also not possible to produce greater steering torques or yaw torques. Accordingly, a redundant steering system constructed in this way can contribute in only a very limited manner to influencing the direction of travel.

SUMMARY

For stabilization of a four-wheel vehicle with a wheel hub motor during braking and/or driving, DE 10 2007 043 159 B4 proposes that a so-called axle pivot or Ackerman offset is determined in such a way that the wheel of the vehicle is stabilized.

The present invention is based on the object of creating a method for achieving a redundant steering task for influencing the direction of travel of motor vehicles, which can be produced with technically simple means and accordingly is also economically more favorable.

Through the adjustment of the steering roll radius of at least one of the steering axles before a force component acting orthogonally to the direction of travel is applied to the first steering system in the region of at least one wheel, it is possible for the redundant steering system to bring about a markedly more flexible influencing of the direction of travel of the motor vehicle even for relative small force components. It is thereby possible for motor vehicles, such as, for example, motor vehicles with an at least partially automated driving function, to use a low-cost conventional steering, such as, for example, an axle pivot or Ackerman steering. The redundancy of the steering system can then be ensured in a technically and economically simple manner on the basis of the present invention.

A force component that acts orthogonally to the direction of travel is understood in the present case to mean that a force applied to the first steering system acts, at least proportionately, orthogonally to the direction of travel. A force of this kind can be introduced, for example, via the brake system of the motor vehicle. Alternatively, the force can also be produced through an adjustment of the wheel suspension of at least one of the wheels of the steering axle by actuators. Obviously, other approaches for introducing the required force are also conceivable and can be employed by the person skilled in the art, depending on the design of the steering system, the wheels, the drive system, the braking system, and the wheel suspension.

Even though the present invention can be utilized fundamentally in combination with many different steering technologies, it is provided, in particular, for utilization of the invention with an axle pivot or Ackerman steering.

In an embodiment of the invention, it can be provided that the force component acting orthogonally to the direction of travel is produced, at least proportionately, through an influencing of the torques that are applied to the at least two wheels of the steering axle. An influencing of the torques independently of one another can be achieved, for example, by braking on one side. However, an influencing of the torques independently of one another can also be achieved by acceleration on one side.

It can also be provided that the force component acting orthogonally to the direction of travel is produced, at least proportionately, through an influencing of the rotational speeds of the at least two wheels of the steering axle relative to one another. An influencing of the rotational speeds of the at least two wheels of the steering axle relative to one another can be achieved, in turn, by braking on one side or by acceleration on one side.

The force component acting orthogonally to the direction of travel can be produced, at least proportionately, through an influencing of the respective power that is supplied by a drive motor of the motor vehicle and can be applied to the at least two wheels of the steering axle.

Through the force component acting orthogonally to the direction of travel, on the one hand, a strong yaw torque is directly applied to the motor vehicle and, on the other hand, forces are applied to the steering mechanism, as a result of which, via the coupling with the steering gear, the influenced wheels cause the non-influenced wheels to turn in a desired direction of travel as well.

A solution of this kind can be advantageous, because the first steering system and the braking system or drive system of the motor vehicle usually act fully or nearly fully autarchically of each other. Full or nearly full redundancy is made possible in this way. Even when there is a failure of the steering system that causes a complete blocking of the steering system, it is nonetheless possible, through an influencing of the applied torques or rotational speeds, to achieve a residual steering effect via the yaw torque.

In another embodiment of the invention, it can be provided that the force component acting orthogonally to the direction of travel is produced, at least proportionately, through an adjustment of the toe angle of at least one of the wheels of the steering axle. Such a manipulation of the wheel suspension or of the wheel bearing can occur, for example, through actuators of the wheel suspension.

An example for a wheel suspension that can be adjusted by actuators is a so-called twin tandem wheel bearing, which is described in DE 10 2009 033 105 A1. Disclosed therein is an adjustment device for a wheel suspension of motor vehicles, in which a wheel camber angle and a steering angle can be adjusted by use of at least one actuator.

The force component acting orthogonally to the direction of travel can be utilized for adjusting a steering angle. In this way, depending on the previously adjusted steering roll radius, the direction of travel of the motor vehicle can be influenced to a defined extent through the redundant steering system.

In an advantageous variant of the invention, it can be provided that the steering roll radius of the at least one steering axle is adjusted in such a way that the steering roll radius is quantitatively increased, starting from a default setting, during the operation of the redundant steering system.

A default setting of the steering roll radius can be, in particular, a negative steering roll radius. A negative steering roll radius can, as mentioned in the introduction, make possible a markedly increased comfort in the control of the steering system. In order to augment the functional scope of the redundant steering system, it can be advantageous to increase the track-stabilizing, comfortable steering roll radius. Accordingly, the steering roll radius can be adjusted to a slightly negative value, a neutral value, a slightly positive value, or, especially preferred, a strongly positive value. In the case of a strongly positive steering roll radius, even a slight engagement, in particular through the force component acting orthogonally to the direction of travel, it is possible for a large effect on the entire first steering system to be manifested. An influencing of individual wheels that are attached to the steering axle of the first steering system can thus bring about an influencing of the entire steering system, that is, the non-influenced wheels can also be deflected.

In one embodiment of the invention, it can be provided that the steering roll radius is adjusted at a front axle of the motor vehicle and/or the force component acting orthogonally to the direction of travel is applied to a front axle of the motor vehicle. This can be advantageous, in particular, when the at least one steering axle is also designed as a front axle of the motor vehicle, as is usually the case for most motor vehicles. Obviously, it can also be provided that the steering roll radius is adjusted at a rear axle of the motor vehicle, and/or the force component acting orthogonally to the direction of travel is applied to a rear axle of the motor vehicle.

In an enhancement of the invention, it can be provided that, depending on an input of a driver at a steering control, a control and/or a regulation controls/control or regulates/regulate the redundant steering system through the set values of the steering roll radius of the steering axle and/or through the torques that are applied to the wheels and/or through the toe angles of the wheels. In particular, a regulation that influences the redundant steering, depending on an input of a driver at a steering control, can be used in an advantageous way. In the optimal case, the redundant steering can then act like a conventional steering or like the first steering and, even in the event of a failure of the first steering, the driver can still steer the motor vehicle with nearly no restriction. Obviously, as set values, it is possible, additionally or alternatively, also to take into consideration the rotational speeds of the wheels.

In one embodiment of the invention, it can be provided that the steering roll radius is adjusted in that a camber angle and/or a king pin inclination and/or one pivot point or a plurality of pivot points of the wheel suspensions of the at least one steering axle is or are adjusted by means of an actuator.

The term camber or camber angle refers to the inclination of the plane of the wheel with respect to the inner side of the motor vehicle or with respect to the outer side of the motor vehicle in relation to a straight line orthogonal to the roadway surface. Through the manipulation of the camber, the steering roll radius can be influenced in that the contact point of the wheel contact surface with the roadway is shifted. The term king pin inclination refers to the change in the inclination of the steering axis itself. It is thereby possible to adjust the steering roll radius as well, because the point of intersection of the imaginary, extended line of the steering axle can be shifted by the roadway surface. An adjustment of the steering roll radius can also be achieved in that one pivot point or a plurality of pivot points of a wheel suspension is or are shifted. In an enhancement of the invention, it can be provided, in particular, that a twin tandem wheel bearing or a double wishbone is utilized as a wheel suspension. If need be, it can also be provided that the steering roll radius is adjusted through a manipulation of the wheel rim offset. A direct manipulation of the so-called disturbing force lever arm can be provided in that the wheel suspension is shiftably mounted parallel to the plane of the roadway.

In an enhancement of the invention, it can be provided that the redundant steering system is automatically engaged when the first steering system fails or is restricted in its function. It can also be provided that the redundant steering system merely assists the first steering system when, for example, the power steering of the motor vehicle fails. Obviously, the redundant steering system can also be utilized when the first steering system completely fails. This also applies in the event of a blocking of the first steering system. In the event of a blocking of the first steering system, a residual steering effect can exist via the yaw torque of the motor vehicle.

The invention also relates to a motor vehicle with a redundant steering system, comprising a steering axle with at least two wheels, wherein the wheels are joined to the steering axle through wheel suspensions that can be adjusted by actuators, and a device for producing a force component acting orthogonally to the direction of travel in the region of at least one wheel, said device acting on the first steering system. In this way, it is provided that the redundant steering system has an apparatus for adjusting the steering roll radius of at least one of the steering axles and at least one electronic regulation instrument and/or control instrument, on which a method for influencing the direction of travel of motor vehicles can be implemented.

As a wheel suspension, it is possible to use, in particular, a twin tandem wheel bearing, such as described in DE 10 2009 033 105 A1, or a double wishbone suspension.

The invention further relates to a computer program with program code means in order to carry out a method for influencing the direction of travel of motor vehicles, as described above, when the program is run on a microprocessor of a computer, in particular on an electronic regulation instrument and/or control instrument of a motor vehicle. A software solution of this kind can be advantageous, for example, when the sensors and actuators required for the method are already present on the hardware side. In this case, it is possible to conduct function upgrades by means of a simple software update. This affords, among other things, advantages of an economic nature and in terms of customer satisfaction, and an increase in the residual value of the motor vehicle.

BRIEF DESCRIPTION OF DRAWING

Exemplary embodiments of the invention are described below on the basis of the drawings, from which additional features in accordance with the invention ensue. Features of an exemplary embodiment can also be implemented independently of the other features of the same exemplary embodiment and accordingly can be combined with features of other exemplary embodiments by the person skilled in the art. In the figures, functionally identical elements are furnished with the same reference numbers.

Shown schematically are.

DETAILED DESCRIPTION

Figure 1:
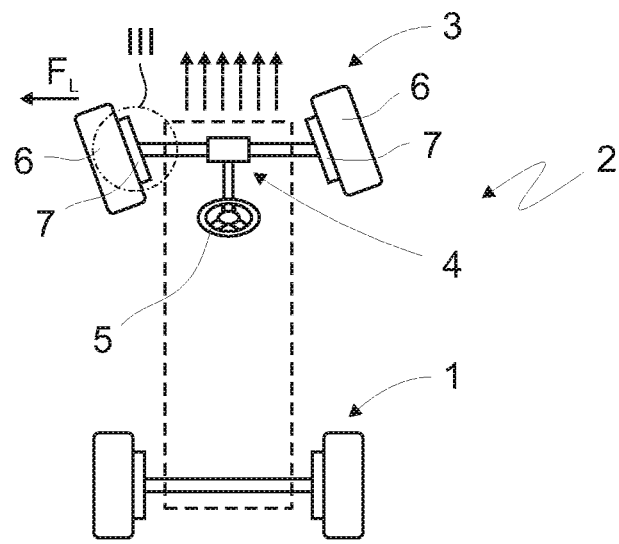
FIG. 1 an illustration of a steering system of a motor vehicle.

FIG. 1 shows, in very schematic form, a rigid rear axle 1 of a motor vehicle 2, a front steering axle 3 of the motor vehicle 2 with a first steering system 4, and a steering control 5 in the form of a steering wheel 5. In this case, the two front wheels 6 are attached to wheel suspensions 7 and joined to the steering axle 3. In the exemplary embodiment, the first steering system 4 is designed as a conventional steering system 4, that is, for example, as an axle pivot or Ackerman steering. Via the conventional steering system 4, it is possible to influence a direction of travel of the motor vehicle 2 in a known way.

It is provided to produce a redundant steering system by adjusting a steering roll radius $R\phi$ (see FIG. 2) of the steering axle 3, according to which a force component $F_L$ that acts orthogonally to the direction of travel, which is indicated in FIG. 1 by parallel arrows, is applied in the region of at least one wheel 6 to the conventional steering system 4. In the present exemplary embodiment, it would be especially advantageous to adjust the steering roll radius $R\phi$ at the front axle 3, that is, at the steering axle 3 of the motor vehicle 2. It can be equally advantageous to apply the force component $F_L$ acting orthogonally to the direction of travel at the front axle 3, that is, at the steering axle 3 of the motor vehicle 2.

It is provided that the wheels 6 are connected to the steering axle 3 through a wheel suspension 7 that can be adjusted by actuators. As a wheel suspension 7, it is possible to use, for example, a twin tandem wheel bearing 8 (see FIG. 3), as described in DE 10 2009 033 105 A1.

For example, the force component $F_L$ acting orthogonally to the direction of travel can be produced proportionately through an influencing of the torques that are applied to the at least two wheels 6 of the steering axle 3. For an influencing of the direction of travel of the motor vehicle 2 toward the left in FIG. 1, it is possible, for example, to slow down the left front wheel 6 of the motor vehicle 2 in FIG. 1. Optionally, it can be provided, in addition, to accelerate the right front wheel 6. However, it can also be provided to accelerate solely the right front wheel 6 of the motor vehicle 2 of FIG. 1, while the left front wheel 6 remains uninfluenced. Through all of the mentioned embodiments, a yaw torque is produced, as a result of which the motor vehicle 2 tries to turn around the more slowly rotating wheel 6. This is even possible when the conventional steering system 4 is completely blocked owing to a total failure.

Owing to the fact that the steering roll radius $R\phi$ was previously changed and, preferably starting from a default setting, was quantitatively increased, the conventional steering system 4 is fundamentally prone to manipulations or disruptions. Through the applied force component $F_L$ acting orthogonally to the direction of travel, for example, due to influencing of the respective torques that are applied to the at least two wheels 6 of the steering axle 3 and the thereby resulting yaw torque, the entire conventional steering system 4 is influenced. A deflection of the entire steering system, including the non-influenced wheels 6 is thereby produced.

The force component $F_L$ acting orthogonally to the direction of travel can also be produced via an adjustment of the toe angle or by other adjustments of the wheel suspension 7, 8 by actuators.

It can be provided that the redundant steering system is engaged automatically when the conventional steering system 4 fails or is restricted in its function. A control and/or a regulation of the redundant steering system can then be controlled or regulated, depending on an input of a driver at the steering control 5, through the set values of the steering roll radius $R\phi$ of the steering axle 3 and/or through the torques that are applied at the wheels 6 and/or through the rotational speeds of the wheels 6 and/or through the toe angles of the wheels 6.

Figure 2:
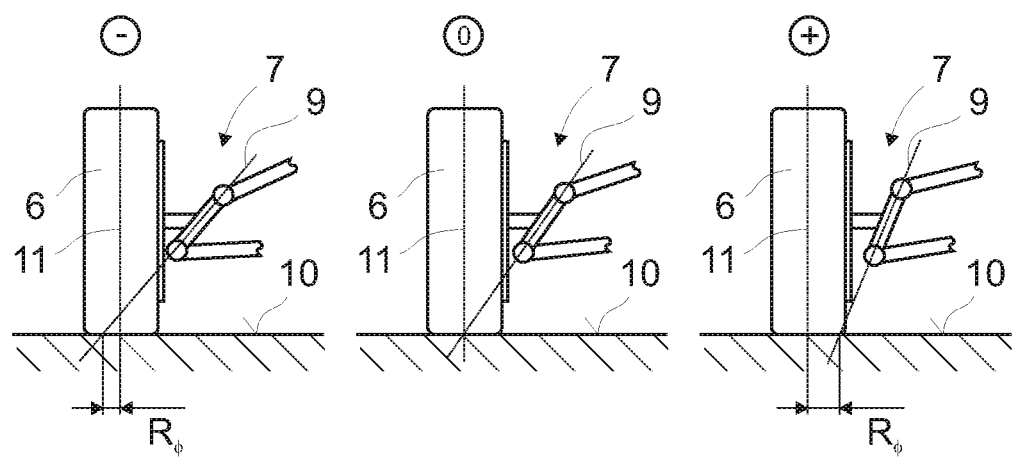
FIG. 2 three exemplary settings for a steering roll radius.

Illustrated in FIG. 2 are three exemplary setting possibilities for the steering roll radius $R\phi$. A negative steering roll radius $R\phi$ (see illustration on the left in FIG. 2) is present according to definition when the imaginary, extended line of the steering axis 9 intersects the roadway surface 10 further outward than does the centerline 11 of the wheel contact surface. A negative steering roll radius $R\phi$ acts in a track-stabilizing manner and is often utilized in motor vehicles 2 for reasons of comfort. However, a negative steering roll radius $R\phi$ is poorly suited for realizing a redundant steering by influencing the torque, for example. The negative steering roll radius $R\phi$ would obviously also counteract any desired influencing of the steering system, that is, any influencing arising from the redundant steering system, and correspondingly stabilize the tracking. Therefore, it can be advantageous to increase quantitatively the steering roll radius $R\phi$ prior to engagement of the redundant steering system. Such an increase can be aimed, for example, at a steering roll radius $R\phi=0$ (see the middle illustration in FIG. 2), for which the point of intersection of the imaginary, extended line of the steering axis 9 extends through the point of intersection of the centerline 11 of the wheel contact surface with the roadway surface 10. This represents a good compromise between comfort and a possible influencing of the redundant steering system described here. If it is provided to increase still further the functional scope of the redundant steering system proposed here, the steering roll radius $R\phi$ can also be adjusted to a positive or strongly positive value. The point of intersection of the imaginary, extended line of the steering axis 9 through the roadway surface 10 extends further inward in this case, that is, closer to the center of the motor vehicle 2, relative to the point of intersection of the centerline 11 of the wheel contact surface with the roadway surface 10.

Figure 3:
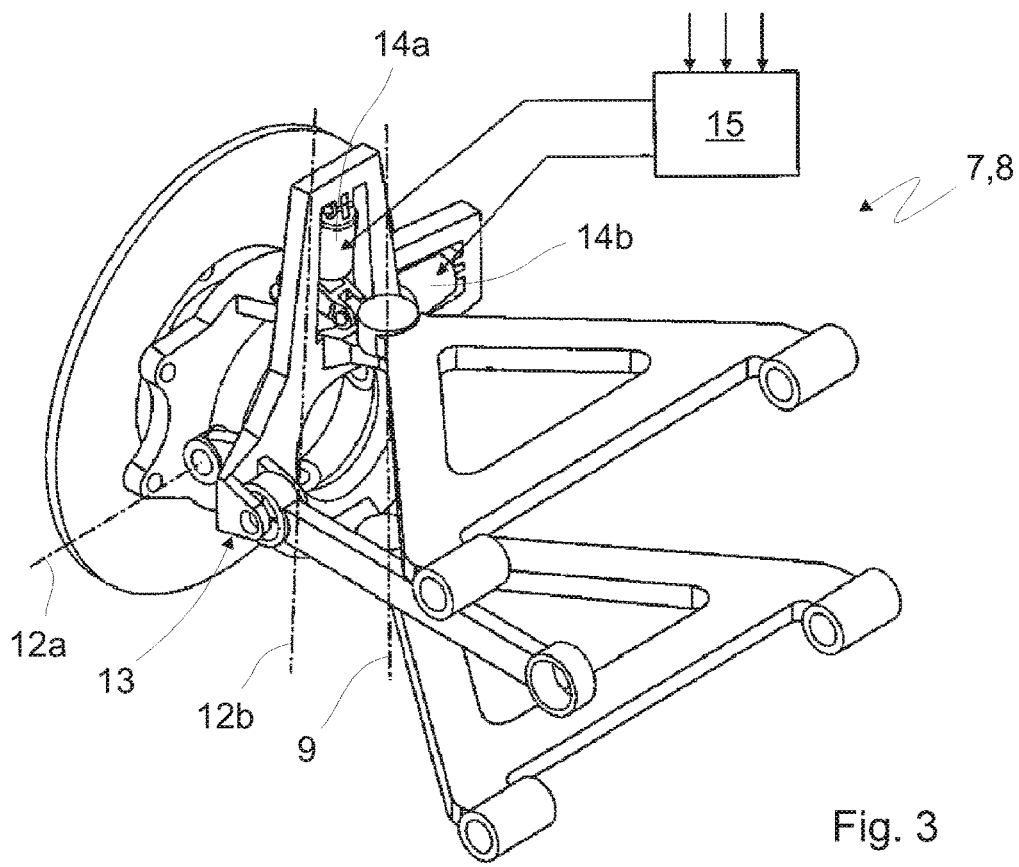
FIG. 3 a twin tandem wheel bearing of DE 10 2009 033 105 A1 for use with the invention.

Illustrated in FIG. 3 is a twin tandem wheel bearing 8, which can find use, in an advantageous manner, as a wheel suspension 7. What is involved is an illustration in accordance with DE 10 2009 033 105 A1. In this case, FIG. 3 shows a left-side wheel suspension 7. In the present case, two pivot axes 12a, 12b of the twin tandem wheel bearing 8, which can pivot cardanically, are connected to a base plate 13, so that both the camber angle α (see FIG. 4)—around the horizontal pivot axis 12a—and the steering angle—around the vertical pivot axis 12b—of the wheel 6 can be adjusted. For the adjustment, two roughly cylindrically designed actuators 14a, 14b are provided, which, in a way that is not illustrated, are composed of an electric motor and a self-locking adjusting drive, in particular, a linear screw drive. The electric motors of the actuators 14a, 14b are connected to an electronic control instrument 15 and can be correspondingly actuated for individual and simultaneous adjustment of the camber angles α or of the steering angles. For further details, reference is made to DE 10 2009 033 105 A1.

In combination with the present invention, the illustrated twin tandem wheel bearing 8 can be used in a simple manner for adjusting the steering roll radius $R\phi$ through a change in the camber angle α (see FIG. 4) via the actuator 14a. After adjustment of the steering roll radius $R\phi$, it is possible, as already mentioned, through an influencing of the torques that are applied to at least two wheels 6 of the steering axle 3, to apply the force component $F_L$ acting orthogonally to the direction of travel to the conventional steering system 4. The illustrated twin tandem wheel bearing 8 can also be used for applying a force component $F_L$ acting orthogonally to the direction of travel on the conventional steering system 4 through an adjustment of the toe angle by way of the actuator 14b. An adjustment of the toe angle α [sic] and an influencing of the rotational speeds of the at least two wheels 6 of the steering axle 3 relative to one another or an influencing of the respective torques applied to the wheels 6 can be used in combination.

Figure 4:
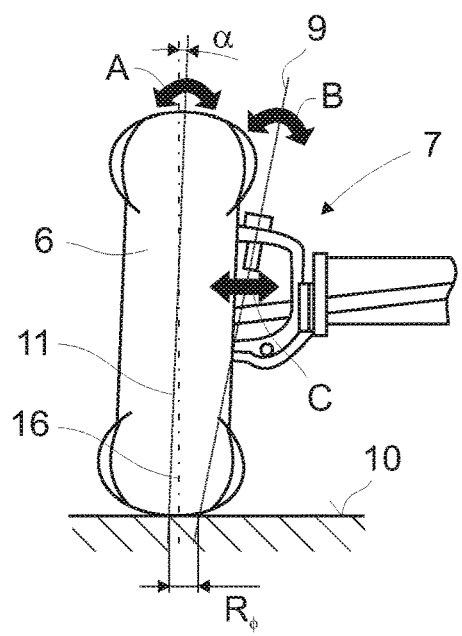
FIG. 4 an illustration of different set values for adjusting the steering roll radius on the basis of an exemplary wheel.

It can be provided that the steering roll radius $R\phi$ is adjusted via further measures. For clarification, several possible set values are indicated in FIG. 4 on the basis of an exemplary wheel 6. For example, the steering roll radius $R\phi$ can be adjusted by adjusting the camber angle α of the wheel 6, this being indicated in FIG. 4 by the arrow A. Therefore, the inclination of the plane of the wheel in relation to an orthogonal line 16 through the roadway surface 10 is changed. In this way, the distance to the point of intersection of the imaginary, extended line of the steering axis 9 through the roadway surface 10 can be adjusted, and accordingly also the steering roll radius $R\phi$. Alternatively, a king pin inclination, that is, an adjustment of the steering axis 9, can also influence the steering roll radius $R\phi$, this being indicated in FIG. 4 by the arrow B. It is also possible for a horizontal shift of the wheel suspension 7—for example, through manipulation of the wheel rim offset, that is, through a direct influencing of the so-called disturbing force lever arm—to change the steering roll radius $R\phi$, this being indicated in FIG. 4 by the arrow C. Adjustments of this kind can occur via actuator measures.

Figure 5:
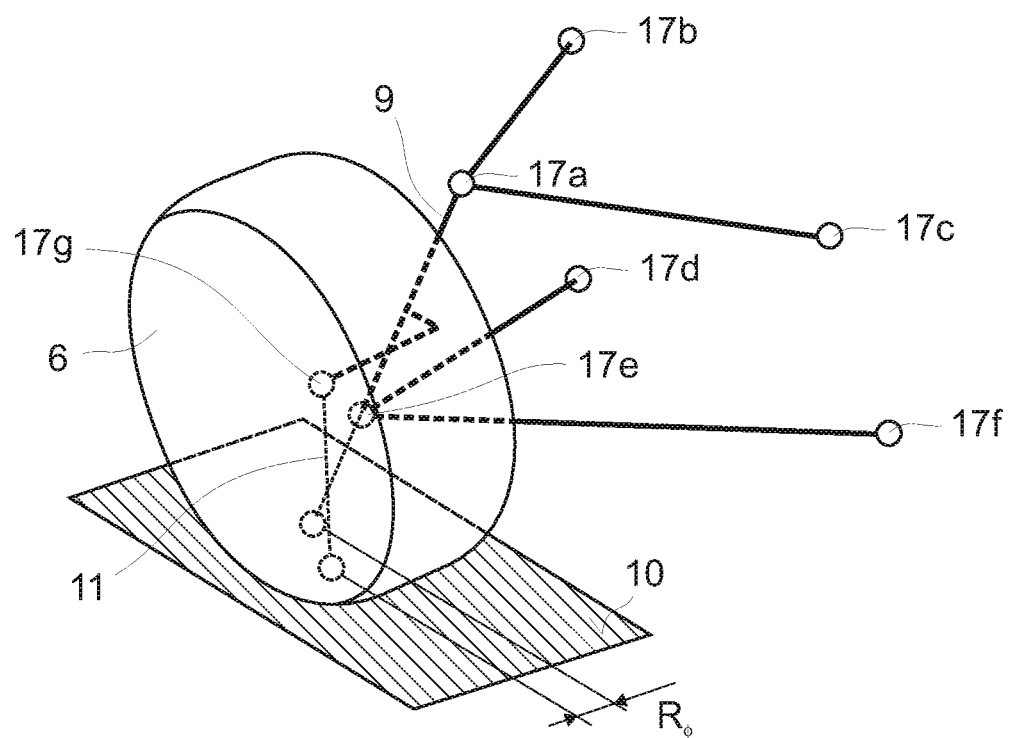
FIG. 5 possible pivot points of a wheel suspension for adjusting the steering roll radius.

Illustrated in FIG. 5 are several pivot points 17 of a wheel suspension 7. A manipulation of these pivot points 17, which is made possible, for example, through the technical features of a twin tandem wheel bearing 8, can serve for the manipulation of the steering roll radius $R\phi$. For example, the pivot points 17a and/or 17e of the wheel suspension 7 can be shifted. If, for example, the pivot point 17e is moved outward, that is, away from the motor vehicle 2, then the steering roll radius $R\phi$ is quantitatively increased, because the king pin inclination of the steering axle 9 changes. A movement of the pivot point 17e inward, that is, toward the motor vehicle 2, leads to a reduced steering roll radius $R\phi$.

Figure 6:
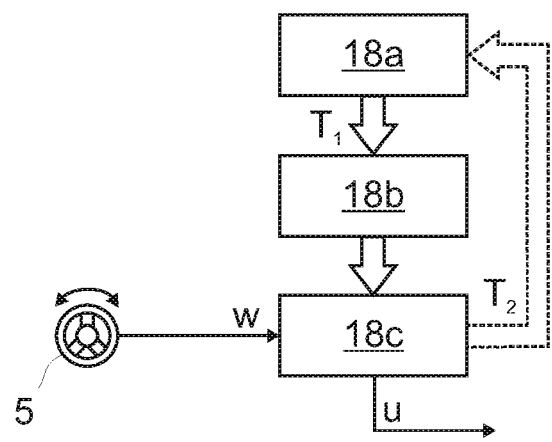
FIG. 6 an embodiment of the method according to the invention based on a flow chart.

Shown schematically in FIG. 6 is a flow chart of a possible embodiment of the invention. Fundamentally, it is provided that, during the proper operation of the conventional steering system 4, the redundant steering system exists in a default state 18a, in which it does not influence the motor vehicle 2. A failure or partial failure of the conventional steering system 4 can serve as a trigger $T_1$ for engaging the redundant steering system. When the redundant steering system is engaged, the steering roll radius $R\phi$ can initially be increased, starting from a default setting, this being identified in FIG. 6 as a state 18*b*. Subsequently, in the state 18*c*, depending on an input of a driver at a steering control 5*a*, illustrated in FIG. 6 as a desired value w, a control and/or a regulation can control or regulate the redundant steering system through the set values u, comprising the steering roll radius Rϕ and/or the torques that are applied to the wheels 6 and/or the toe angles of the wheels 6. Obviously, it is also possible to take into consideration the respective rotational speeds of the wheels 6. Accordingly, the driver of the motor vehicle 2 can still control the motor vehicle 2, and, if need be, drive it to a repair shop even in the event of a total failure of the conventional steering system 4. Optionally, it can also be provided that, an operational readiness of the conventional steering 4 is used as a further trigger $T_2$. In this case, the redundant steering system can again be deactivated and reverted to the default state 18*a*.

The illustrated course of FIG. 6 can be implemented, for example, as a computer program with program code means on a microprocessor of a computer, in particular, on an electronic regulation instrument and/or control instrument 15 of a motor vehicle 2.

The invention claimed is:

1. A method for influencing the direction of travel of motor vehicles, wherein the motor vehicle comprises a first steering system, having at least one steering axle with at least two wheels, wherein the wheels are connected to the steering axle through wheel suspensions that can be adjusted by actuators, comprising:

realizing a redundant steering system by adjusting a steering roll radius of at least one of the steering axles, according to which a force component acting orthogonally to the direction of travel in the region of at least one wheel is applied to the first steering system, wherein the redundant steering system does not influence the motor vehicle during proper operation of the first steering system.

2. The method for influencing the direction of travel of motor vehicles according to claim 1, wherein the force component acting orthogonally to the direction of travel is produced, at least proportionately, through an influencing of the torques that are applied to the at least two wheels of the steering axle.

3. The method for influencing the direction of travel of motor vehicles according to claim 1, wherein the force component acting orthogonally to the direction of travel is produced, at least proportionately, through an adjustment of the toe angle of at least one of the wheels of the steering axle.

4. The method for influencing the direction of travel of motor vehicles according to claim 1, wherein the steering roll radius of the at least one steering axle is adjusted in such a way that the steering roll radius is quantitatively increased, starting from a default setting, during the operation of the redundant steering system.

5. The method for influencing the direction of travel of motor vehicles according to claim 1, wherein the steering roll radius at a front axle of the motor vehicle is adjusted, and/or the force component acting orthogonally to the direction of travel is applied to a front axle of the motor vehicle.

6. The method for influencing the direction of travel of motor vehicles according to claim 1, wherein a control and/or a regulation control/controls or regulate/regulates the redundant steering system, depending on an input of a driver at a steering control, through a set values of the steering roll radius of the steering axle and/or through the torques that are applied to the wheels and/or through the toe angles of the wheels.

7. The method for influencing the direction of travel of motor vehicles according to claim 1, wherein the steering roll radius is adjusted by adjusting a camber angle and/or a kingpin inclination and/or one pivot point or a plurality of pivot points of the wheel suspensions of the at least one steering axle by means of an actuator.

8. The method for influencing the direction of travel of motor vehicles according to claim 1, wherein the redundant steering system is engaged automatically when the first steering system fails or is restricted in its function.

9. A motor vehicle, comprising:

a first steering system, having at least one steering axle with at least two wheels, wherein the wheels are connected to the steering axle through wheel suspensions that can be adjusted by actuators;

a redundant steering system comprising a steering axle with at least two wheels, wherein the wheels are connected to the steering axle through wheel suspensions that can be adjusted by actuators, and a device for producing a force component acting orthogonally to the direction of travel in the region of at least one wheel, which acts on the first steering system, wherein the redundant steering system has an apparatus for adjusting the steering roll radius of at least one of the steering axles and at least one electronic regulation instrument and/or control instrument on which a method according to claim 1 can be implemented, and wherein the redundant steering system is configured to not influence the motor vehicle during proper operation of the first steering system.

10. A computer program with program code means for carrying out a method according to claim 1, when the program is run on a microprocessor of a computer, in particular on an electronic regulation instrument and/or control instrument of a motor vehicle.

* * * * *